(12) United States Patent
Franjic et al.

(10) Patent No.: US 7,535,633 B2
(45) Date of Patent: May 19, 2009

(54) LASER AMPLIFIERS WITH HIGH GAIN AND SMALL THERMAL ABERRATIONS

(76) Inventors: Kresimir Franjic, 1545 Bathurst St. Apt. #404, Toronto (CA) M5P 3H6; Renzhong Hua, 240 Wellesley St., East, Apt. #821, Toronto (CA) M4X 1G5; R. J. Dwayne Miller, 21 Elmwood Avenue, Port Credit (CA) L5G 3J6

( * ) Notice: Subject to any disclaimer, the term of this patent is extended or adjusted under 35 U.S.C. 154(b) by 213 days.

(21) Appl. No.: 11/328,450

(22) Filed: Jan. 10, 2006

(65) Prior Publication Data
US 2006/0153257 A1 Jul. 13, 2006

Related U.S. Application Data

(60) Provisional application No. 60/642,112, filed on Jan. 10, 2005.

(51) Int. Cl.
*H01S 5/00* (2006.01)
*H01S 3/16* (2006.01)
*H01S 3/042* (2006.01)

(52) U.S. Cl. ............... 359/344; 372/36; 372/50.12; 372/50.22

(58) Field of Classification Search .............. 359/344; 372/50.12, 50.22, 36
See application file for complete search history.

(56) References Cited

U.S. PATENT DOCUMENTS

| | | | |
|---|---|---|---|
| 4,757,268 A * | 7/1988 | Abrams et al. ........... | 359/338 |
| 5,315,612 A | 5/1994 | Alcock ................. | 372/69 |
| 5,495,490 A * | 2/1996 | Rice et al. ............. | 372/34 |
| 5,553,088 A | 9/1996 | Brauch et al. .......... | 372/34 |
| 6,167,069 A * | 12/2000 | Page et al. ............ | 372/34 |
| 6,195,372 B1 * | 2/2001 | Brown ................. | 372/34 |

(Continued)

OTHER PUBLICATIONS

Clarkson, W A. *Thermal effects and their mitigation in end-pumped solid-state lasers*. J. Phys. D: Appl. Phys., 34, pp. 2381-2395. 2001.

(Continued)

*Primary Examiner*—Eric Bolda
(74) *Attorney, Agent, or Firm*—Lynn C. Schumacher; Hill & Schumacher

(57) ABSTRACT

The present invention discloses a laser amplifier with high gain and low thermally induced optical aberrations on the amplified laser beam. The amplifier designs allow simple multipass configurations to optimally extract the gain and reduce thermally induced index of refraction aberrations, making it possible to obtain an amplified laser beam of high quality combined with very high overall gains comparable to those achievable with expensive regenerative amplifiers. The amplifier includes a thin active laser solid to create the population inversion and associated heat generation within the thin laser active solid possible for the desired gain value. The system includes a cooling device in thermal contact with the thin active laser solid to provide good heat transport and high reflectivity coatings at the wavelengths of the pump and laser wavelengths. The pump light sources are laser diodes tuned to the maximum absorption of the laser active material. The amplifier also includes an optical system to transport the pump light to the laser active solid in such a way as to further confine the absorption of light along the two orthogonal directions in the plane of the laser active solid in order to get high population inversion and consequently high gains possible.

23 Claims, 13 Drawing Sheets

U.S. PATENT DOCUMENTS

| | | | |
|---|---|---|---|
| 6,347,109 B1 | 2/2002 | Beach et al. | 372/75 |
| 6,385,220 B1 | 5/2002 | Miller et al. | 372/34 |
| 6,396,857 B1 * | 5/2002 | Labranche et al. | 372/36 |
| 6,944,196 B2 | 9/2005 | Wittrock | 372/34 |
| 2002/0036821 A1 * | 3/2002 | Hollemann et al. | 359/342 |
| 2002/0110164 A1 * | 8/2002 | Vetrovec | 372/36 |
| 2003/0053508 A1 | 3/2003 | Dane et al. | 372/70 |
| 2003/0160034 A1 * | 8/2003 | Filgas et al. | 219/121.68 |
| 2003/0161375 A1 | 8/2003 | Filgas et al. | 372/66 |
| 2004/0076211 A1 | 4/2004 | Wittrock | 372/70 |
| 2004/0114657 A1 | 6/2004 | Vetrovec | 372/70 |

OTHER PUBLICATIONS

Backus, Sterling, Bartels, Randy, Thompson, Sarah, Dollinger, Robert, Kapteyn, Henry C., Murnane, Margaret M. *High-efficiency, single-stage 7-kHz high-average-power ultrafast laser system.* Optics Letters, vol. 26, No. 7, pp. 465-467. Apr. 1, 2001.

Brown, David C. *The Promise of Cryogenic Solid-State Lasers.* IEEE Journal of Selected Topics in Quantum Electronics, vol. 11, No. 3, pp. 587-599. May/Jun. 2005.

St. Pierre, Randall J., Mordaunt, David W., Injeyan, Hagop, Berg, Jacqueline G., Hilyard, Rodger C., Weber, Mark E., Wickham, Michael G., Harpole, George M., Senn, Robert. *Diode Array Pumped Kilowatt Laser.* IEEE Journal of Selected Topics in Quantum Electronics, vol. 3, No. 1, pp. 53-58. Feb. 1997.

* cited by examiner

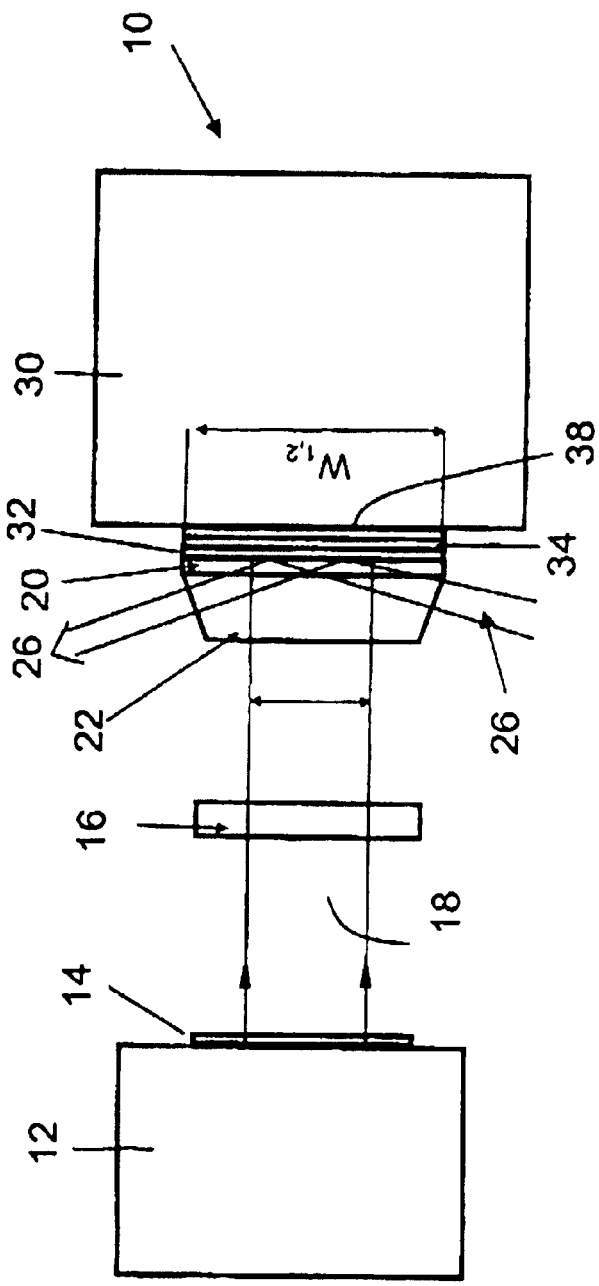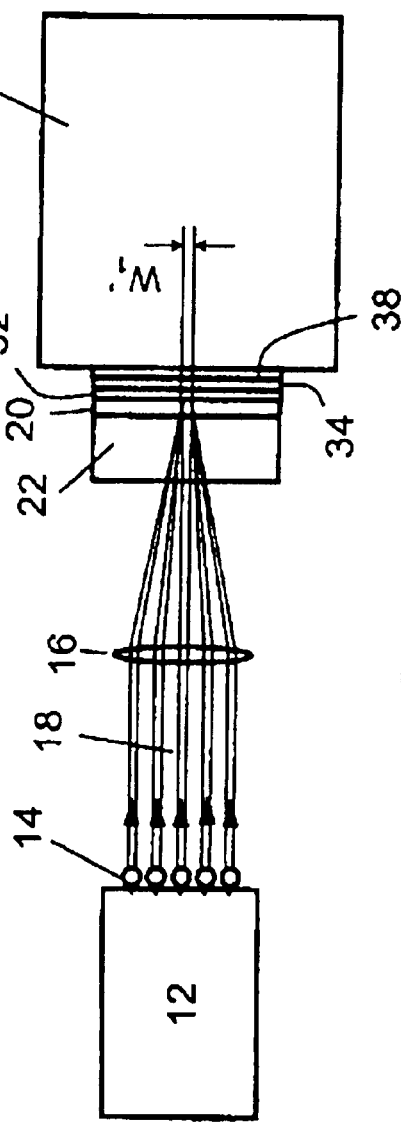
Figure 1(a)
Figure 1(b)

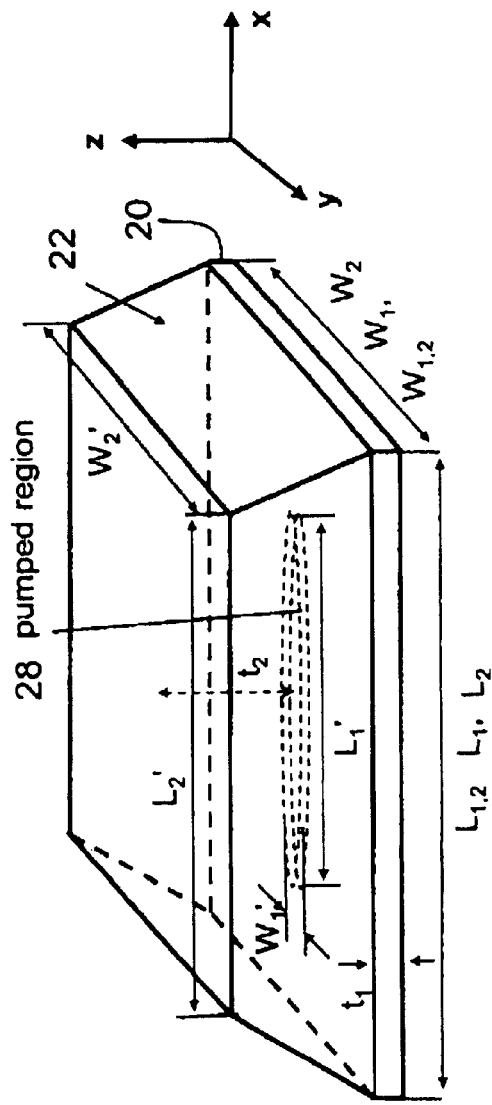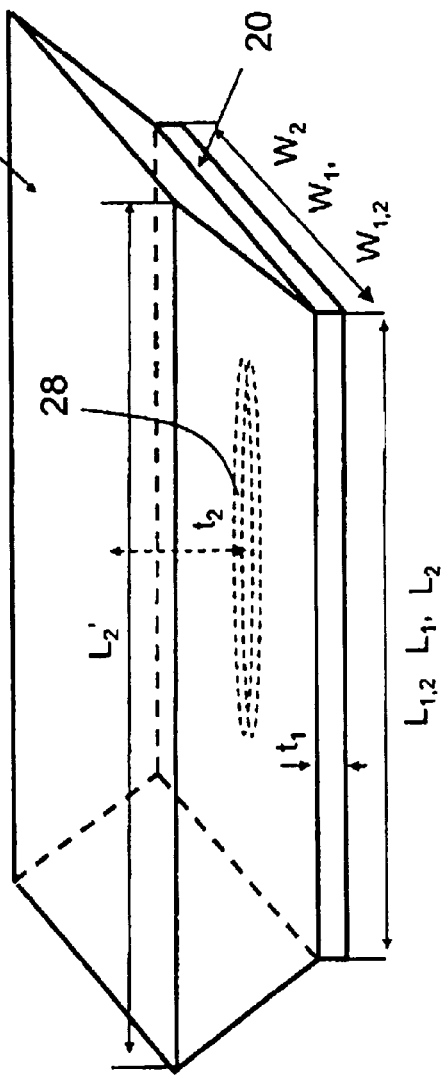
Figure 2(a)
Figure 2(b)

LASER AMPLIFIERS WITH HIGH GAIN AND SMALL THERMAL ABERRATIONS

CROSS REFERENCE TO RELATED APPLICATION

This patent application relates to, and claims the priority benefit from, U.S. Provisional Patent Application Ser. No. 60/642,112 filed on Jan. 10, 2005 entitled LASER AMPLIFIERS WITH HIGH GAIN AND SMALL THERMAL ABERRATIONS, filed in English, and which is incorporated herein in its entirety.

FIELD OF INVENTION

The present invention relates to solid state laser amplifiers and laser gain modules for high power laser resonators.

BACKGROUND OF INVENTION

Compact, efficient, high gain amplifiers and laser resonators are needed in a variety of applications in which one requires high output laser powers in the smallest package possible. These applications include high power free space amplifiers for fibre oscillators [1] and amplifiers for short pulsed laser systems as a means to replace complex regenerative amplifiers [2]. The use of high power and high gain amplifiers enables a new class of compact high peak power and high average power laser sources for material processing, laser manufacturing, and medical and dental applications for the highest processing speeds possible.

Solid state laser technology has now advanced up to the point where the average powers and peak power of pulsed sources has reached a threshold where a number of new applications is now possible. These applications have been greatly limited in scope due to the lack of sufficiently compact, low cost, robust laser system technology to move beyond the demonstration phase. If the laser technology can be made robust and more cost effective a number of important applications are on the horizon.

Some of the most important applications involve pulsed laser applications. It is under pulsed conditions that is possible to delivery energy to a material quickly, strongly localized the absorbed energy, and thereby raise the temperature of the material to its highest point to drive ablation processes in reshaping the material to a desired product [3]. The process of laser ablation and cutting, laser marking, etc. are more efficient the more strongly localized the energy is within the material both spatially and temporally.

There have been numerous methods developed over the years to achieve the required power classes [4]. The challenge is achieving sufficiently high gain conditions as prescribed above without compromising laser brightness. As laser gain media are pumped higher and higher to achieve larger gains, by whatever power source, there is an increase in the temperature of the laser gain media as not all the power transferred to the laser gain media is extracted by the laser beam. Some form of cooling is required to prevent thermal damage of the laser gain media. The conditions of pumping and non-uniform cooling lead to a highly aberrated thermal lens inside the gain media as a consequence of the temperature dependence of the index of refraction [4, 5]. This is the so called mirage effect; as things get hot they expand and the index of refraction decreases for most materials.

Due to the nonlinear conditions of laser amplification, these thermal aberrations act in a similarly nonlinear fashion to clamp the attainable laser brightness for any given cooling/pumping condition. The laser beam quickly goes from diffraction limited $TEM_{00}$ mode to higher order modes that can not be focused as tightly and thereby reduces the source brightness as well as greatly reducing the working distance over which the beam can achieve its tightest focus. This problem is further exacerbated in the pursuit of high gain amplifiers where one must focus the pump light to the smallest area possible to achieve the maximum gain per unit length for any given gain material. This latter condition can be readily understood. There is a particular stimulated emission cross section for any given atomic or molecular species that is responsible for the laser transition/laser action. By confining the excited species to the smallest area (largest number of excited states per unit area) the probability a photon from an incoming laser beam entering the gain medium stimulating a photon emission event (and avalanche amplification) increases accordingly.

The conditions of confinement of the exciting pump light to achieve the highest gain conditions increases the heat deposited per unit area and the associated thermal gradients such that the problem of thermal aberrations becomes compounded. In addition to this consideration, under the high gain conditions considered here, there is also the prospect of spontaneous stimulated emission triggering a photon avalanche that depletes the gain by a process known as accumulated stimulated emission or ASE [4]. This problem not only limits the extractable gain but also destroys pulse quality by adding long tails to the amplified pulse which as explained above is highly deleterious to avoiding accumulated thermal damage in laser processing.

The problem of ASE is most significant when the laser gain medium is being used as an amplifier; within a properly designed laser resonator these stimulated photons contribute to the laser beam rather than behave parasitically. Optimal designs of high gain amplifiers/gain media must specifically address thermal aberrations and ASE issues from diminishing beam quality and efficiency. Of these two issues, the thermal aberrations are most limiting with respect to power scaling and laser brightness.

The various methodologies that have been developed to deal with thermal aberrations can be reduced to a few basic concepts employing two general strategies. One strategy is to try to minimize the magnitude of the thermal aberrations themselves for example by employing designs that lead to faster heat transfer to keep the laser gain medium cooled [4], more uniform cooling to reduce index of refraction gradients in the transverse direction of beam propagation so that all parts of the laser beam experience the same index of refraction spatial profile [6, 7], and the use of cooling to reduce the magnitude of the change in the index of refraction with temperature by reducing the thermal expansion [8]. The other strategy is to use beam configurations for sampling the pumped gain region in such a way as to average out the thermal aberrations as much as possible such that all parts of the laser beam experience the same spatial profile for the index of refraction and thereby remove thermal lensing and aberration effects [9, 10].

Brauch et al. have disclosed the use of thin disc laser gain media in which thermal aberrations are removed for laser beams coming in perpendicular to a cooled surface [6]. Under uniform pumping conditions, there are no transverse components to the index of refraction spatial profile experienced by the laser beam in the gain medium for this configuration.

Wittrock [7] has used the concept of removal of thermal aberrations in which the laser beam to be amplified is brought in at a very small angle to the cooled surface, rather than normal to the surface as in the Brauch et al design [6], to enable cancellation of the thermal gradients upon reflection as first described by Alcock and Bernard [10] in the grazing incidence amplifier design. The relatively large acute angle to the surface normal enables a much longer interaction region with the gain media and fewer passes to achieve the same overall gain as the thin disc concept of Brauch et al.

It is noted that both the Wittrock and Brauch et al. designs require uniform pumping over the entire laser active solid to rigorously provide 1 dimensional cooling. If uniform pumping is not accomplished the concept fails to remove thermal aberrations. Furthermore, the condition of uniform pumping greatly reduces the power extraction efficiency while maintaining high brightness for the laser beam to be amplified.

Laser amplifiers with lower gain require more round trips to extract the same power as high gain systems and thereby experience more loss. In principle, it is possible to have 100% percent reflectors such that a low gain system requiring up to 10 passes or more to extract power has the same efficiency as a much higher gain system that only requires one pass. As a matter of practice, high gain systems are essential to reduce the dimensions, number of optical surfaces involved in beam transport into and out of the laser gain medium, and the overall path length traversed by the laser beam to be amplified to attain maximum stability and efficiency.

The Wittrock design is capable of higher overall gain per pass relative to the Brauch et al design, however it relies on completely uniform pumping of the laser active material. The laser beam to be amplified in this design concept is brought in appreciably perpendicular to the normal of the cooled surface such that the beam experiences all nonparallel components to the isotherms. In this case, the laser beam to be amplified or resonator beam must be significantly smaller in diameter than the uniformly pumped gain region to avoid diffraction losses and nonparallel isotherms from edge effects. The only way to increase the gain of the laser active solid in this design concept is to increase the pumping uniformly.

From a practical standpoint, the temperature rise in typical gain media with intimate contact with a heat sink reach elevated temperatures of tens to hundreds of degrees. The exposed surfaces with only air to dissipate the heat get to extremely high temperatures under these same pumping conditions and thermally fracture. Surface heating is a well known effect that limits laser power and it is for this reason there are patents explicitly covering the use of fused undoped end caps to reduce surface temperatures [11]. Diode pumped laser systems are designed specifically to avoid pump light near surfaces or to use undoped end caps to avoid surface heating and fracture for even modest laser powers and gains.

It would therefore be very advantageous to provide a laser amplifier which avoids the aforementioned difficulties and which can provide high gain and small thermal aberrations.

SUMMARY OF THE INVENTION

The present invention provides a solid state laser amplifier system which overcomes these limitations in achieving high gain and beam quality by using a combination of thin laser gain media with laser beam propagation paths along different axes that substantially cancel the thermal aberrations and permit the use of nonuniform pumping for high gain.

In one aspect of the invention there is provided a solid-state laser amplifier system, comprising:

a) at least one laser-active solid having dimensions length $L_1$, width $W_1$, and thickness $t_1$;

b) a pumping light source;

c) light beam shaping optical system positioned adjacent to the pumping light source for shaping and directing a pump light beam from said pumping light source into a first surface of said at least one laser-active solid with an elliptical, round, or rectangular beam of light with a length or long axis $L_1'$ and a width $W_1'$ satisfying a condition $L_1'/W_1' \geqq 1$ and $L_1' < L_1$ and width $W_1' < W_1$, and wherein a region of said at least one laser-active solid illuminated by the beam of light produces a pumped gain region defined by dimensions $L_1' \times W_1' \times r_1$ of said at least one laser-active solid, and wherein $t_1$ is in a range from 10 microns to 1 millimeter so as to most strongly localize the absorbed light and ensuing pumped gain region that develops from pumping said at least one laser-active solid with said pump light;

d) a cooling device, wherein the laser-active solid is slab-shaped and is fixedly connected at a second surface thereof to the cooling device, and wherein a major portion of heat generated in the laser-active solid by the pump light is removed by the cooling device to cool the second surface of the laser-active solid and, wherein the slab-shaped laser active solid includes periodically disposed channels of length between about 0.1 micron to about 100 microns, said channels being filled with an absorbing material or scattering centers to introduce regions of absorption and scattering losses along a direction defined by $L_1$ and prevent accumulated stimulate emission along the $L_1'$ pumped region from depleting the gain in this direction and accompanying reduction in pulse quality for use in the amplification of laser pulses; and e) an optical system configured to bring the laser beam to be amplified into the laser active solid at an angle to a normal to the first surface of the laser active solid to remove substantially nonparallel isotherms that arise from nonuniform pumping of the laser active solid by the pump light beam and cooling requirements to achieve high gain conditions for the laser beam.

DESCRIPTION OF DRAWINGS

The solid-state laser amplifier system produced according to the present invention will now be described, by way of example only, reference being made to the accompanying drawings, in which:

FIG. 1(a) is a top view showing a solid-state laser amplifier system with a diode laser array pump light source;

FIG. 1(b) is a side view of the laser amplifier of FIG. 1(a) in which details of the system when used with vertically stacked diode array can be visualized;

FIG. 2(a) shows part of the laser amplifier showing the laser active solid and laser inactive solid and dimensions used for these components;

FIG. 2(b) is similar to FIG. 2(a) but a different configuration of the laser inactive solid coupled to the laser active solid;

DETAILED DESCRIPTION OF THE INVENTION

Figure 1C:
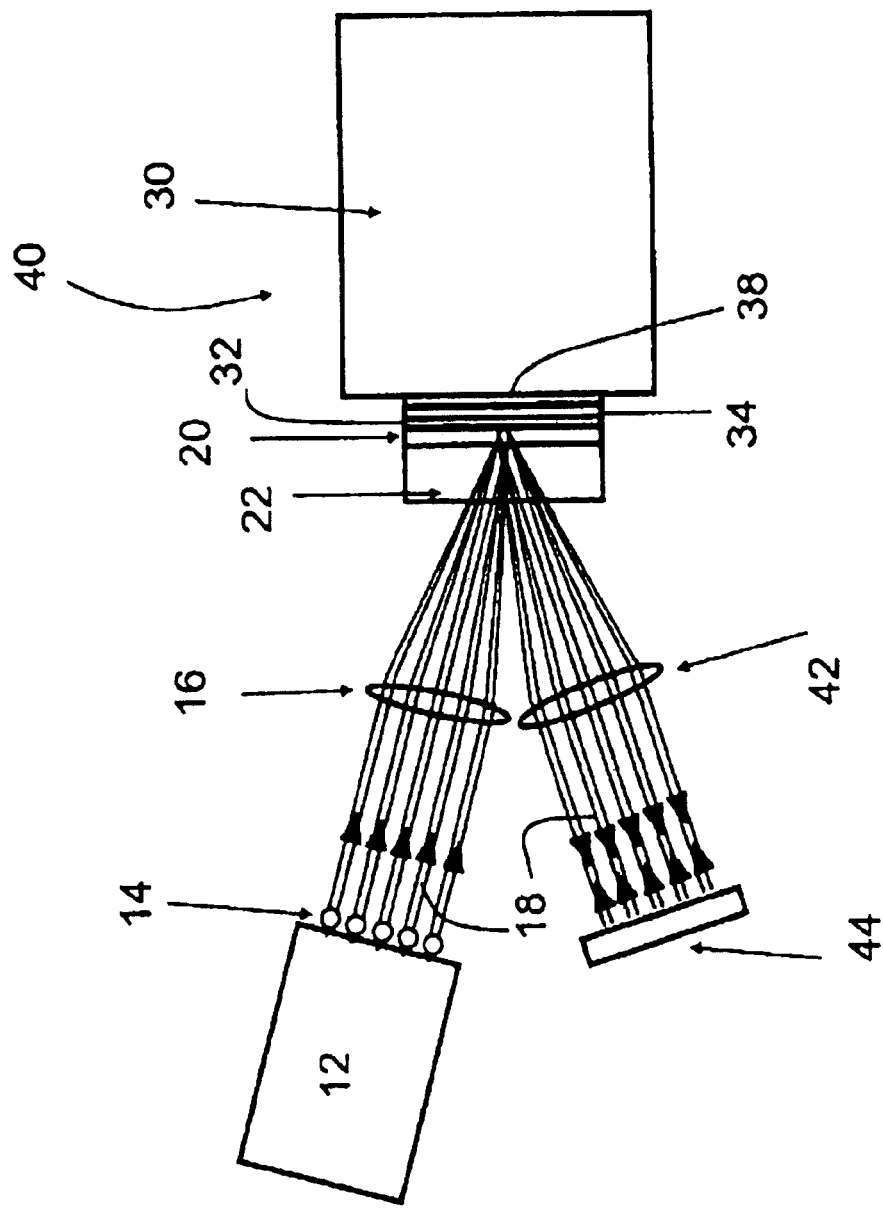
FIG. 1(c) shows a side view of an embodiment of an amplifier which increases pump absorption by a multipass optical system.

The present invention provides a solid-state laser amplifier system for amplifying laser pulses. Basic elements of the solid-state laser amplifier system include: 1) a thin active laser solid of thickness t to absorb light from an appropriate light source (the pump) to create the population inversion and associated heat generation within the smallest value of t possible for the desired output power of the device; 2) a pump source comprised of a laser diode or arrays of laser diodes tuned to the maximum absorption of the laser active atom, ion, or molecule; 3) an optical system to transport the pump light to the laser active solid in such a way as to further confine the absorption of light along the two orthogonal directions in the plane of the thin laser active solid; 4) contact of the thin active laser solid to a cooling device with an appropriate material to give good heat transport and high reflectivity of light at the pump and laser wavelengths; 5) a cooling device that maintains the temperature of the active laser solid under pumped conditions at the temperature at which the temperature dependent variations of the index of refraction of the said active solid are sufficiently reduced to achieve the desired output power; 6) angular multiplexing of the incoming laser beam to be amplified to cancel transverse components to the thermally induced index of refraction aberrations; and also to increase energy extraction from the said gain region.

Preferred embodiments may also include an appropriate non-active laser solid, typically the same as the host material used for the laser active solid fused or bonded [13] or some other mechanical means to the laser active solid, to provide mechanical support for the thin laser active solid and which is shaped in such a way as to enable the coupling of the incoming and output beams within such a way for canceling the thermal aberrations and also to act as a heat buffer for the heat generated at the surface of the said active solid and thus reducing thermal aberrations even further. The system may be designed to provide for multipasses of the pump beam through the laser active solid to increase the amount of light absorbed in the desired volume or gain and to achieve an even greater degree of averaging out thermal induced differences in the index of refraction experience by the laser beam.

The system may also include periodically introduced absorber or other loss structures along the pumped gain region of the laser active solid as needed to minimize ASE effects from depleting the stored gain in the laser active media for obtaining higher gain in the amplification of the laser beam. In addition, spatial filters may be used for the laser beam which are placed between subsequent passes of the laser beam being amplified through the active solid in order to improve the beam quality of the amplified laser beam. The system may also include a cryogenic cooling device to attain an operating temperature below a threshold value, under pumped conditions within the laser active region, at which point the index of refraction changes with temperature are negligibly small (near or at dn/dT=0 point) [8, 12, 14].

An important physical feature of this invention is the use of a very thin laser active solid. The dimensions of $t_1$ will typically be between 10 microns and 500 microns, depending on the absorptivity of the laser active solid at the pump wavelength. The dimension $t_1$ is made as small as possible while still large enough to enable more than 50% absorption of the pump light with the optical system used for transporting the pump light. This value should be compared to more typical laser rod dimensions of 5 mm; there is an order of magnitude reduction in the dimension of one principle dimension of the laser active solid over conventional laser rods. The use of a thin laser active solid is used specifically to confine the absorbed pump energy to ensure that any heat (q) generation occurs as close as possible to a heat sink. The time ($\tau$) it takes heat generated in one region to undergo diffusive motion with a diffusion constant D to another region scales quadratically with respect to the length separating the two points (X), i.e. $\tau = X^2/6D$.

Thus, the rate of heat transfer to a heat sink scales inversely to the length scale squared over which the heat is generated. The closer the heat can be generated to a heat sink the faster the heat can be removed from the material. The rate of heat transfer (dq/dt) is also proportional to the driving force in this case the difference in temperature ($\Delta T$) between the heat sink and the hot object (dq/dt $\propto \Delta T$). For a fixed absorbed amount of pump laser energy, the thinner the laser gain medium the higher the temperature rise is under steady state pumping conditions. So the amount the heat transfer rate goes up more than quadratically, the thinner the laser active solid is made.

The primary purpose of this invention is to make high gain, high power amplifiers and laser gain modules so that high power solid state lasers can be reduced in dimension to their most compact robust dimensions. The surface heating effect is a major design consideration to meet this objective. The condition of uniform pumping to remove thermal aberrations imposes significant reductions in the achievable gain and extraction efficiency with respect to the present invention as detailed above in the background material.

The problem with the thermal aberrations is handled in a new way that enables the construction of the highest gain possible for a given pump source. The new concept of this invention combines essentially all the proven concepts for reducing the effect of thermal aberrations that heretofore could only be introduced for the most part in isolation. This new feature is enabled by the fact that the laser active solid or gain media in this invention is deliberately made as thin as possible in one dimension to enable simple focusing and angular multiplexing of both pump and laser beam while still maintaining good spatial overlap of both the pump and the laser beam undergoing amplification. The thin feature of the laser active solid in one dimension also facilitates the direct integration of absorbing material, saturable absorbers, and other loss mechanisms directly into the laser active solid to eliminate ASE problems as much as possible.

The overall pumping system and layout for achieving these conditions is described as follows. A side view of a first embodiment of a solid-state laser amplifier system is shown generally at 10 in FIG. 1a in which a laser diode pump source or laser diode array 12 is used in combination with an optical imaging system 14 and 16 to produce a beam of pump light 18 to illuminate an elongated pumped region in the laser active solid or laser gain medium 20. Here the optical imaging system is depicted as a combination of rod lens 14 and cylindrical lens 16 but is not restricted to such.

The term "laser active solid" is used to mean the same thing as the phrase "laser gain medium". These terms are meant to describe suitably doped crystals such as Nd:YVO$_4$, Ti:sapphire, or other combinations of laser active ions, atoms or molecules within a host matrix. A partial list includes laser active ions based on various oxidation states of Nd, Ti, Cr, Er, W, doped in host crystals such as YAG, YVO$_4$, Sapphire, Fosterite to a suitable level to produce strong absorption at available laser diode wavelengths and gain at the desired laser wavelength so that the thickness of the laser active solid can be made as thin as possible. A typical laser active solid 20 for this application may be 1% doped Nd$^{3+}$ in YVO$_4$.

A nonactive, transparent, solid support 22 through which the pump beam 26 passes is shown. This feature provides mechanical support for better handling the thin laser active solid 20 in mounting and removes stresses from the contacted surface of the laser active solid 20 under nonuniform pumping. Equally important it provides a means to serve as a refractive optical element for permitting angular multiplexing of the laser beam 26 to be amplified and the pump beam 18. This non-active solid support 22 would typically be the undoped crystal host of the laser active material 20 to provide good index of refraction matching across the interfaces to eliminate reflection losses as at the surface contacts.

Such a structure can be readily fabricated by diffusion bonding the undoped solid 22 to the doped laser active solid 20 at high temperatures [13]. Other transparent solids with better thermal and mechanical properties can also be used with appropriate mechanical fixtures to hold the laser active solid 20 and the nonactive, transparent, solid support 22 in optical contact. The pumping light source 12 includes a laser diode bar, stack or diode array which are presently available with output powers in excess of 50 W. The heat deposited into the laser-active solid 20 is removed from the laser-active solid by having its lower surface in intimate thermal contact with a cooler 30 to be further defined below.

Figure 4A:
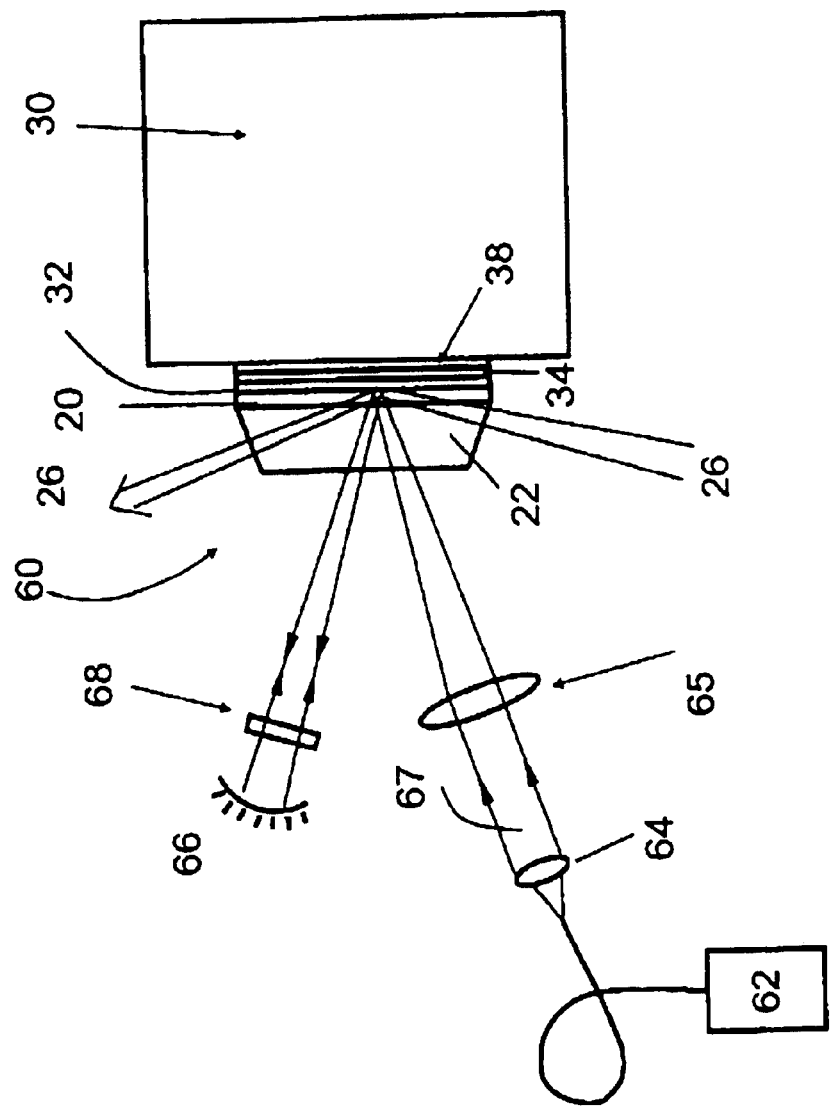
FIG. 4(a) shows an embodiment of a solid state laser amplifier with a fiber coupled laser diode with separated pump beam and seed laser.

Appropriate layers 32 are added to the surface of the laser active solid 20 to achieve high reflection of both pump light beam 18 and the laser beam 26 to be amplified and good thermal conductivity to the cooling device 30. One suitable series of layers to achieve this task is microns thick SiO$_2$ layer 32 followed by a high reflection dielectric coating 34 for the laser beam 26 and pump beam 18 wavelengths, followed by a heat conducting epoxy or indium solder 38 to make thermal contact. The incoming laser beam 26 to be amplified by the laser active solid 20 under pumped conditions is shown to come in at a glancing angle appropriate for grazing incidence amplification with removal of thermal aberrations in the direction of the pump beam 26. Other embodiments showing different beam geometries for improving this are shown in FIGS. 4 and 5.

FIG. 1b shows a view of a solid-state laser amplifier system 40 rotated 90 degrees from the side view of amplifier 10 in FIG. 1a in which vertically stacked diode array 12 is shown combined through cylindrical lens 16 to a common focus as in FIG. 1a but with much higher pump light powers incident on the laser active solid 20 due to the vertically stacked diode array 12. Vertically stacked laser diode arrays are the most cost effective way to scale laser diode array pump sources to higher powers. More diode arrays aligned in the same plane require longer laser gain media and becomes impractical for laser crystals more than a couple of centimeters both for alignment issues and material costs in obtaining sufficiently long crystals of high quality. In addition, horizontally aligned diode arrays have much larger cooling costs as each array requires an independent cooling system.

The ability to use vertically stacked diode arrays in this simple way is an important design concept of the present invention. The working distance over which vertically stacked arrays can be imaged to a focus to most strongly confine the absorbed pump light and achieve the highest gain is very limited. Vertically stacked laser diode arrays are available with pump powers in excess of 500 W and permit a factor of more than 10 scaling in output power. These extremely high power pump laser sources are generally used for uniform pumping of large areas in which case the important directionality property of the laser radiation of the diode emitter is lost and the same pumping effect could be achieved with an incoherent light source. The use of highly doped thin laser active solids to absorb the light within this narrowly defined region enables simple optical systems to be used while maintaining high gain conditions.

FIG. 1c shows a side view of system 40 to show how the pump laser beams can be made to multipass the laser active solid for the more general case involving a vertically stacked laser diode array 12.

Figure 1D:
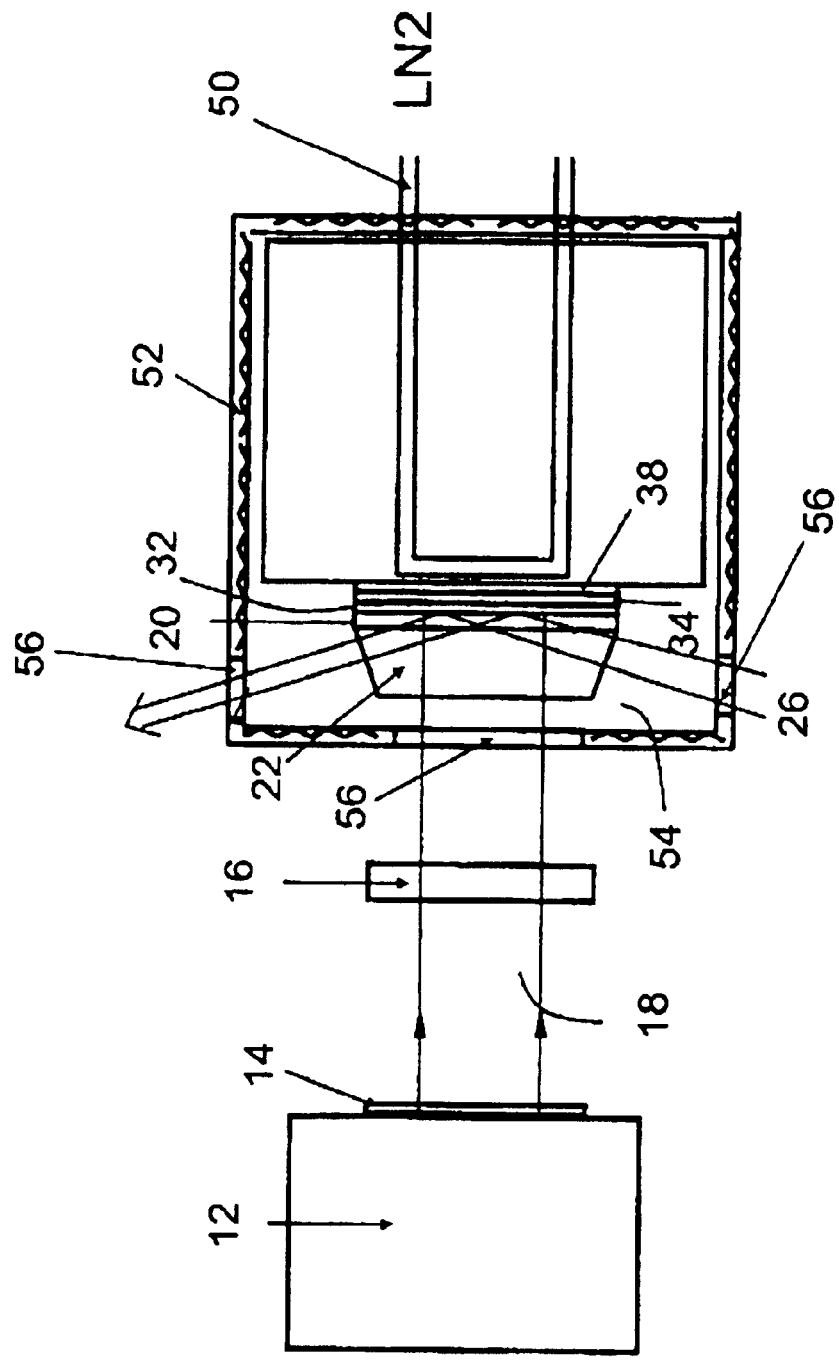
FIG. 1(d) shows an embodiment of a solid state laser amplifier with cryogenic cooling.

FIG. 1d shows the details of the cooling device 30. In many cases normal water cooling of a heat sink or thermoelectric coolers will suffice for modest powers in the 1-20 W range of laser output. The preferred embodiment for maximum power and laser brightness is to use a cryogenic cooler 30 in which a cooling fluid such as liquid nitrogen 50 or other cryogenic fluid is used to drive the temperature of the laser active solid 20 to the zero temperature dependent index of refraction point $dn/dT=0$ at which point all thermally induced aberrations are removed. For certain materials there is a well defined temperature at which $dn/dT=0$. The temperature dependence is derived from thermal expansion. By finding phase transitions at which point there is an extrema in the density of the material, one can achieve $dn/dT=0$ conditions.

More generally, the thermal expansion coefficient decreases with decreasing temperature as the lattice is made stiffer with decreasing temperature and $dn/dT$ approaches zero for all practical purposes over a large temperature range. The wide temperature range is most ideal as the pumping conditions vary and change the temperature of the laser active solid 20. This cooling and maintaining a temperature well below that used conventionally permits a most general solution. This approach has enabled an order of magnitude increase in output powers without deterioration in the spatial quality of the laser beam to be amplified in bulk laser solids by using liquid N$_2$ at temperatures near 77° K. This temperature of the heat sink should remain constant to within ±10 degrees to maintain these effective $dn/dT=0$ conditions within the laser active solid. A suitable cryogenic cooling device is shown in FIG. 1d in which inlets for the cryogenic cooling liquid 50, vacuum insulated walls 52 surrounding the device and evacuated region 54 above the laser active solid 20 with appropriate windows 56 for laser beam 26 and pump beam 18 inputs is shown.

FIGS. 2a and 2b show two different expanded views of the laser-active solid 20 bonded to the transparent nonactive solid 22 to indicate the general proportions of the two slabs 20 and 22 relative to one another. The dimensions $L_1$ refer to the length of the laser active solid 20 along the x direction, $L_{1,2}$ to the common contact length between the laser active solid 20 and transparent undoped material 22. Length $L_2$ refers to the length of the free surface of the transparent solid region 22. Similarly $W_{1,2}$ defines the width of the laser active solid 20 and transparent solid 22 along the y direction. The height of the thin laser active solid 20 is defined by $t_1$ and that of the transparent solid by $t_2$. The pumped gain region 28 where most of the light from the pump source 12 is absorbed, exclusively in the laser active solid 20, is indicated by dashed lines. The dimensions $t_1$ will vary between 10 microns to 1 mm depending on the doping and absorptivity of the laser active solid 20. The minimum thickness for absorbing >50% of the pump light is used and this value depends on whether multiple passes of the pump are employed and gives rise to the stated range. For thickness greater than 1 mm, the thin active laser solid concept loses utility as the heat transport to the cooling device 30, for typical laser material thermal diffusivities, offer no major advantages over bulk laser gain media.

The preferred embodiment is to use 1-3% doped $Nd3+$:$YVO_4$ with a $t_1$ value of less than 400 microns, The dimensions in the other directions depend on the power class and intended gain of the amplifier or gain module. In all cases the For 20 W laser outputs based on 1% doped $Nd^{3+}$:$YVO_4$, the $L_1'$ dimension can be made between 1 mm and 1 cm and the $W_1'$ dimension between 50 microns to 500 microns for small signal, single pass gains in excess of 10. FIG. 2a shows the general structure of a parallelepiped suitable for grazing incidence amplification of the laser beam as a means to reduce the thermal aberrations.

FIG. 2b shows a different orientated trapezoid for creating zig zag beam paths along the z direction for angular multiplexing of the laser beam 26 to be amplified in such a way as to avoid the saturable absorber regions to be further described hereinafter. This embodiment in which the transparent solid region 22 is flipped over relative to its orientation as drawn in FIG. 2(a) is used for creating zig zag paths for the laser beam 26 to be amplified.

Figure 3:
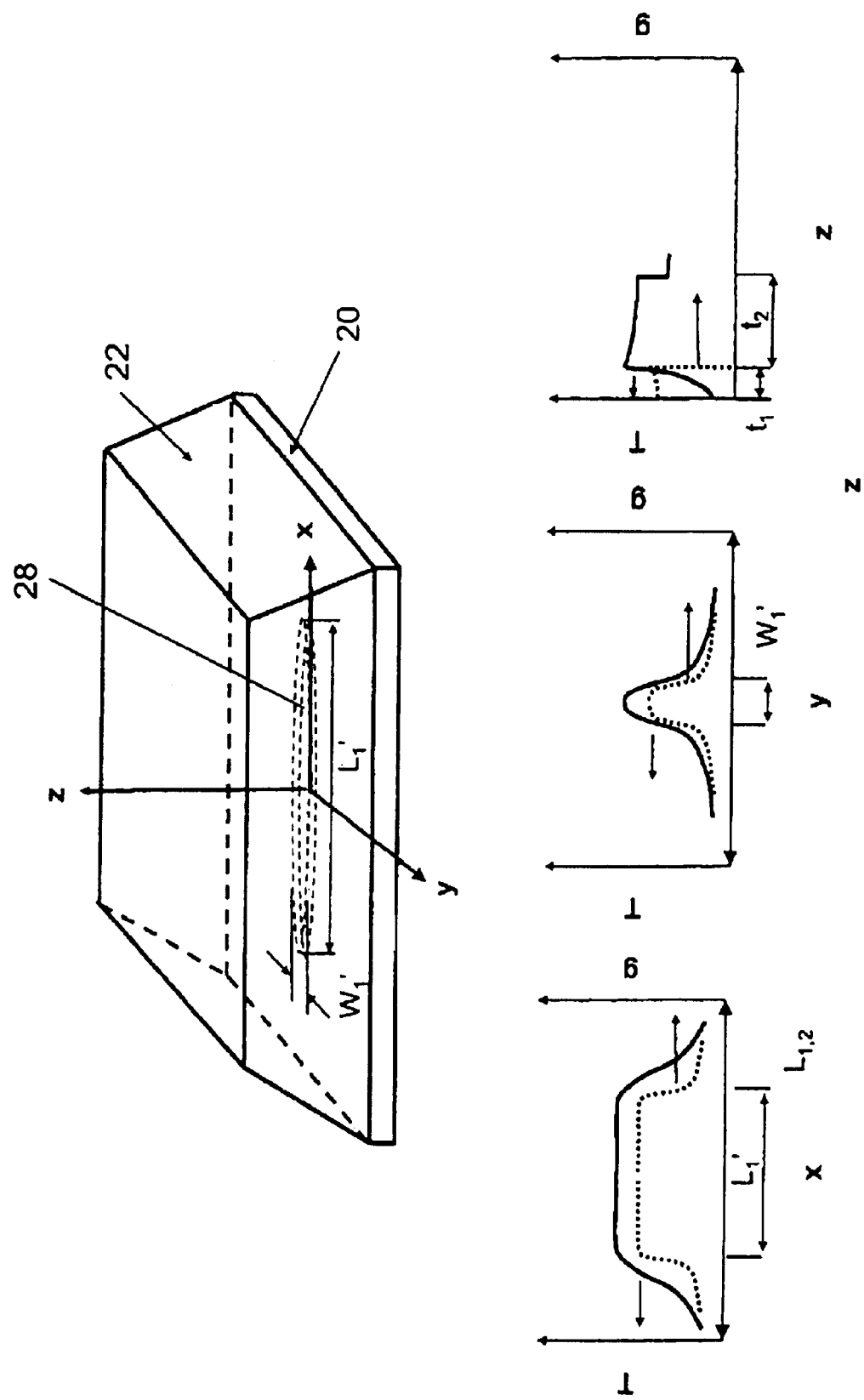
FIG. 3 shows temperature and gain profile in the laser gain region of the solid state laser amplifier along x, y, and z direction.

FIG. 3 shows more detail with respect to the pumped gain region 28 and associated temperature profiles that need to be cancelled through the different laser beam propagation geometries. The pump laser source 12 and optical system 14, 16 create an image within the laser active solid 20 that leads to an elliptical irradiated laser gain zone 28 in which >50% of the light is absorbed with a long axis for the absorbed light indicated as $L_1'$ in the x direction, width of $W_1'$ in the y direction, and near uniform absorption extending the entire width of the laser gain medium to as shown in FIGS. 2(a) and 2(b). The relative dimensions of the pumped region 28 with respect to the laser active solid 20 are as follows: $L_1'/W_1' \geqq 1$, $L_1' < L_1$, and $W_1'$ less than or approximately equal to $W_1$.

The length of the pumped region $L_1'$ is positioned to be between 100 microns to 1 mm back from the laser beam input and output windows and satisfy $L_1' < L_1$. This condition is relaxed along the y direction as the laser pump light is generally intended to be spread out more along the two surfaces orthogonal to the laser beam and cooling device with $L_1'/W_1' > 2$ such that $W_1'$ can be approximately $W_1$ if desired for a more uniform temperature profile in this direction.

The length $L_1$, $W_1$, $L_1'$ and $W_1'$ are modified as needed for a particular power class of amplifiers and gain. Larger dimension for $L_1'$ are used to increase the power and smaller dimensions for $W_1'$ are used to increase the gain per unit length along the x direction by appropriate modification to the optical imaging system 14, 16 for the pump light source 12. The associated temperature profiles are schematically demonstrated in the lower half of FIG. 3. Near uniform intensity profiles for the pump laser beam 18 along the $L_1'$ defined direction and gain saturation lead to a fairly flat temperature distribution along the laser beam propagation direction and corresponding parallel isotherm components to the cooling device 30.

Similarly fairly uniform gain distribution are achieved along $W_1$ (y) and $t_1$ (z) directions with multipass pumping but the influence of the cooling direction modifies the temperature profiles as indicated. It is the nonparallel isotherms in these respective directions that are removed by cryogenic cooling and/or further reduced to acceptable levels for a given pump power by bringing the laser beam 26 in at grazing incidences to the cooling surface to minimize the thermal gradients along z. Smaller angles from the normal to the cooling surface, with more reflections from the cooling surface (laser beam propagation in the xz or yz plane) will provide similar benefits. In like fashion, multiple bounces off the two adjacent surfaces normal to the surface of the cooling device 30, can be used to reduce thermal aberrations in the y direction as needed for a given power class. Note, that the dimensions of the gain media 28 (FIGS. 2(a), 2(b)) in the y direction can also be made to nearly match the pump width for near uniform pumping ($W_1' \sim W_1$) to further minimize gradients. At pump powers in excess of 50 Watts, W1' will be on the order of 100 microns to 1 mm using the same preferred embodiment based on 1% doped $Nd^{3+}$:$YVO_4$.

Figure 6A:
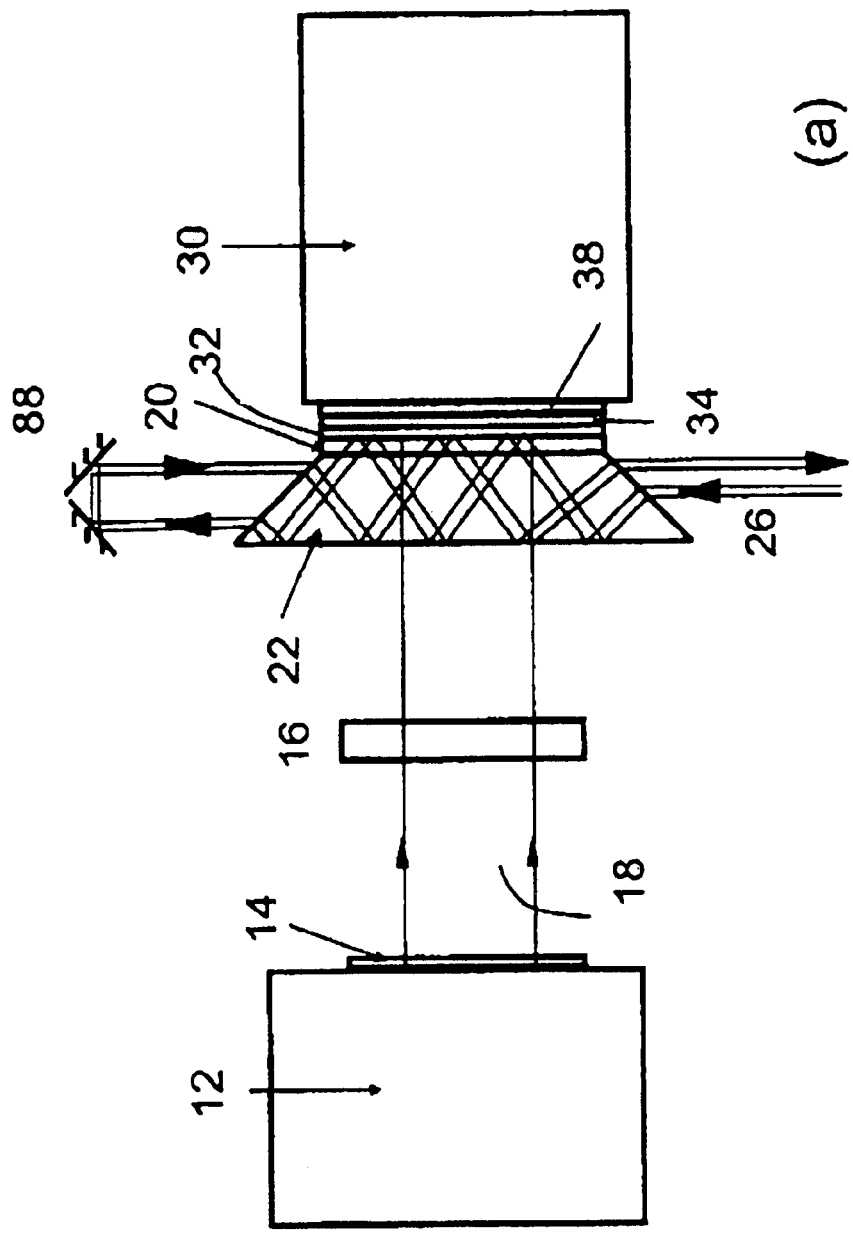
FIG. 6(a) shows an embodiment of a solid state laser amplifier in which the laser beam follows a zig-zag path along z direction.
Figure 6B:
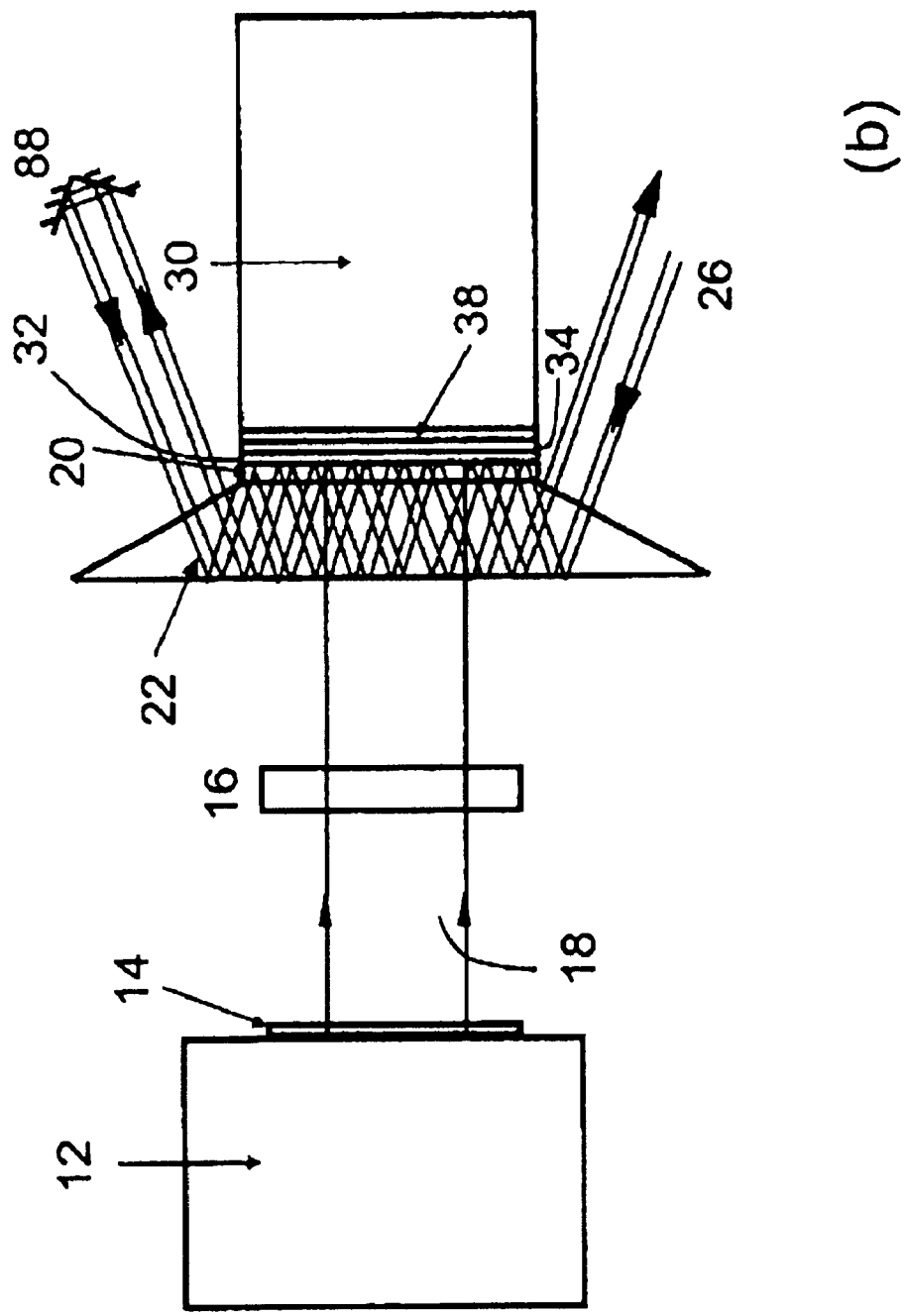
FIG. 6(b) shows an embodiment of a solid state laser amplifier in which the laser beam follows a higher order zig-zag path.

As described above, the trapezoid like structures shown in FIGS. 2(a) and 2(b) formed by the laser active solid 20 and laser inactive solid 22 are designed for bringing the laser beam in preferred beam paths with respect to the laser active solid 20 and transparent solid regions 22 to remove thermal aberrations. Higher order angle multiplexing can be done to sweep out the gain and provide further averaging and cancellation of the thermal aberrations. Two such embodiments are shown in FIGS. 6(a) and 6(b). For geometrical reasons the configuration shown in FIG. 6(a) is simpler to implement with a cryogenic cooler 30. An elliptical laser beam is then used in this few bounce embodiment to extract most of the gain along the $L_1$ direction. These higher order angle multiplexing laser beam configurations are specifically exploited to simultaneously provide beam paths out of the surface plane in contact with the cooling device (within the xz plane) to deliberately avoid the absorbing channels (in the xy plane) by the laser beam undergoing amplification to minimize ASE as will be detailed below.

Apart from laser diode arrays, other means to combine laser diode arrays can be used to generate the approximately round, elliptical, or rectangular shaped pumped gain region as defined by by dimensions $L_1'$ and $W_1'$ within the laser active solid 20. Referring to the embodiment of the laser amplifier shown at 60 in FIG. 4(a) one can use a fibre coupled array laser diode array 62 in which a lensing system including lenses 64 and 65 are used to reflect the pump beam 67 back through the laser gain medium 28 to give the same effective pumping geometry as obtained with the free space focused laser diode arrays 12 of FIG. 1a. A concave mirror 66 and a half-wave wavelength plate 68 are used in which the half-wave plate 68 rotates the polarization to improve the absorption in the subsequent pass for media with strongly polarized transitions for absorbing the light.

Alternatively, the difference in wavelength between the laser beam 26 to be amplified and the pump laser diode arrays, along with the much higher brightness of the fibre coupled laser diode arrays can be exploited to arrange a multipass system in which the pump laser light beam 18 and laser beam 26 to be amplified propagate collinear. Other comparable brightness sources such as multimode lasers can be used in an identical fashion for pumping other gain material where diode lasers are not currently available. One important example is the use of frequency doubled $Nd^{3+}$:YAG lasers for pumping Ti:sapphire based amplifiers [8]. All the same principles embodied above apply to other materials that use different pump light source with similar coherence properties to laser diodes.

Figure 4B:
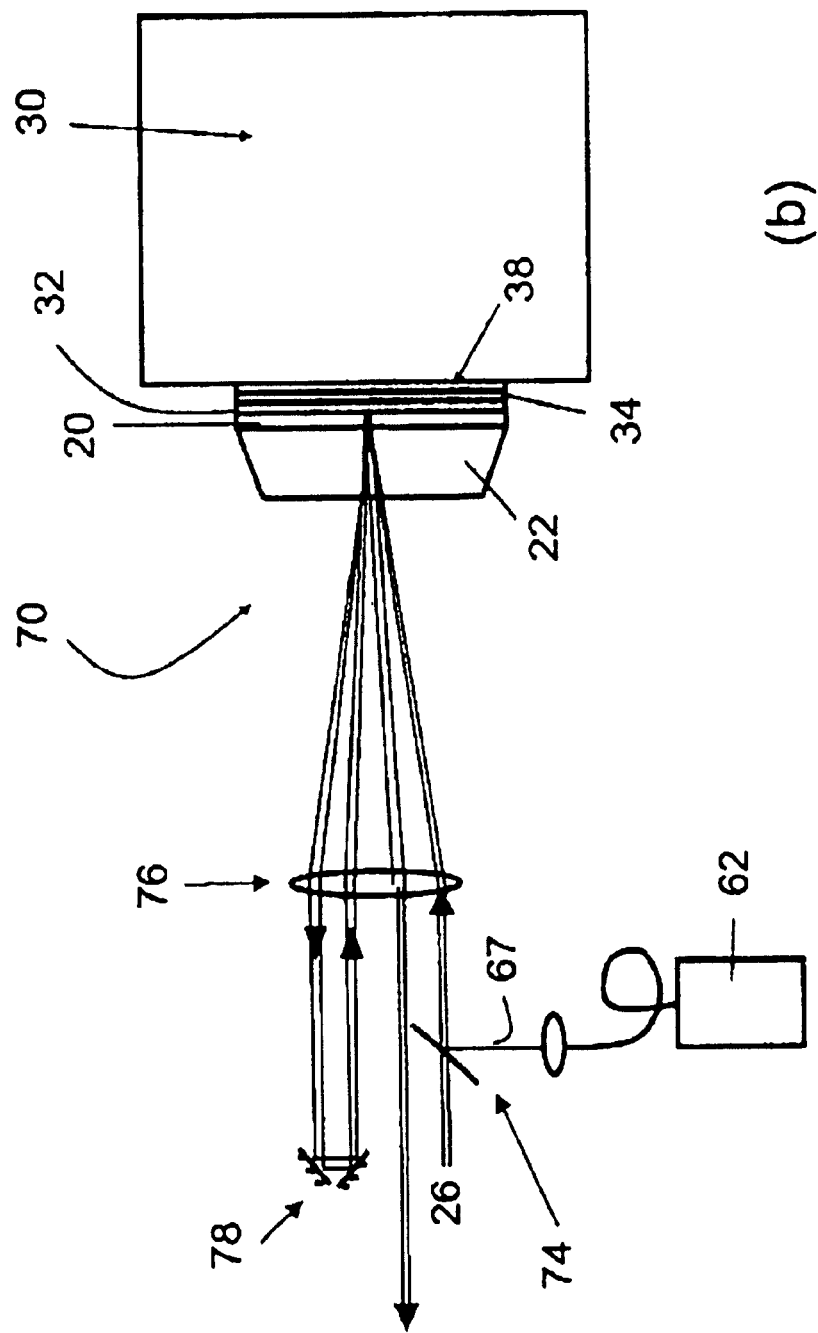
FIG. 4(b) shows an embodiment of a solid state laser amplifier with a fiber coupled laser diode with spatially co-propagating pump and seed laser beams in a multipass configuration.
Figure 5:
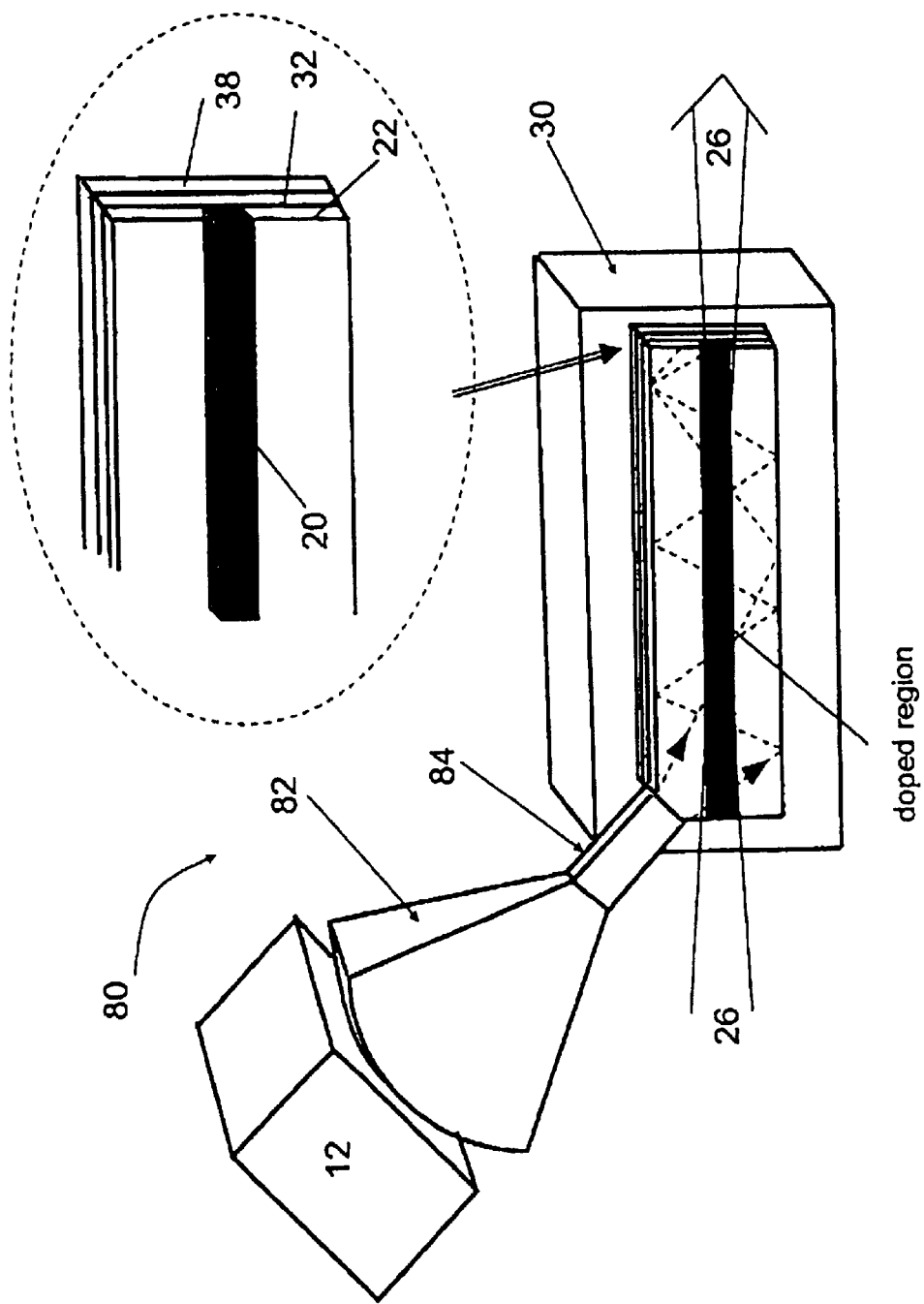
FIG. 5 shows an embodiment of a solid state laser amplifier with a laser diode stack plus lens duct. Inset: details of thin laser active solid with a sandwich structure used for gain confinement.

The configuration as shown in FIG. 4(b) guarantees alignment of the spatial overlap between the pumped gain region 28 and the laser beam 26 to be amplified for optimal alignment in which amplifier 70 includes a fibre coupled laser diode array 72 which is directed to dichroic mirror 74 which combines both pump laser beam 67 and the laser beam 26 to be amplified in a collinear fashion. Both the pump beam 67 and seed laser beam 26 are brought in at an angle to the surface normal using a lens 76 and is passed through the active laser gain media 28 and then reflected back using a mirror 78 until the pump energy is optimally depleted from the pump beam 67 and the gain or power optimally extracted by the laser beam 26. This arrangement guarantees spatial overlap between the pump beam 67 and laser beam 26 over the entire interaction path length. In the advent of very strong pump light requiring only a few passes, the pump beam 67 and laser beam 26 can be combined using separate optical sytems rather than being made collinear.

The use of fibre coupled diode arrays as part of the overall invention is advantageous as they produce output beams with circular cross sections that greatly facilitate the collimation of the pump beam that permit collinear beam propagation of both pump and laser beam for the simplest possible alignment. The same concept for fibre coupled diode arrays producing round pump beams, as opposed to highly elliptical pump beams of lens coupled laser diode arrays, extends to all laser pump sources of similar mode or higher brightness. Fibre coupled arrays also provide a simple means to exchange diode laser arrays once the laser diode array pump source is at the end of its lifetime and needs to be replaced and therefore have great utility in implementing this invention.

The unique properties of thin gain media enable the use of low brightness imaging sources such as lens coupled diode arrays, high order mode pump lasers, and fibre coupled diode arrays in multipass configurations for highest gain extraction efficiency. The highly spatially confined laser gain media using the laser active solids of the type described herein also permit the use of non-imaging optics for guiding the pump light to achieve high gain conditions that is the primary focus of this invention. Since non-imaging optics such as lens ducts are not capable of providing a focused images by definition, the pump light must be made to be confined in the smallest possible volume for maximum gain by the structure of the doped laser active gain media itself.

This feature to the invention can be made to accommodate non-imaging optics by bonding two transparent solids along the opposite faces perpendicular to the laser beam propagation and cooling surface. The physical dimension $W_1'$ is now the same as the same as $W_1$ of the laser active solid region. The material bonded to the sides of the gain media 20 should be undoped crystals of the same material as the host crystal for proper index of refraction matching to avoid diffraction losses on the laser beam best matched to extract the gain from this region. This feature gives a flat temperature profile over the entire gain region as depicted in FIG. 3 along the y direction and acts to further reduce thermal aberrations. This design feature for high gain amplifiers with thin gain media is shown schematically in FIG. 5 for one such embodiment 80 using a lens duct 82 which is used to direct the appropriate pump light onto the laser active region 28 through a waveguide 84.

The surface of all the laser inactive solids may be coated with high reflection coatings such as to confine the pump light. In this case, the laser inactive region 22 would be mechanically bonded rather than fusion bonded to simplify construction. The use of a sapphire clamping body as previously described by Miller et al. [15] would be particularly appropriate in this application to both remove heat and eliminate surface deformations and thermal fracture issues for the surface of the laser active gain region not bonded to the cooling device.

The above describe generally how to strongly confine the absorbed pump light into a very thin laser active solid in close contact with a heat sink for maximum power and gain for the most compact gain structure possible prior to the onset of thermal fracture for a given power class and laser active material. This statement is made as thermal diffusivities, thermal expansion coefficients and stress fracture limits are all material dependent.

Figure 7:
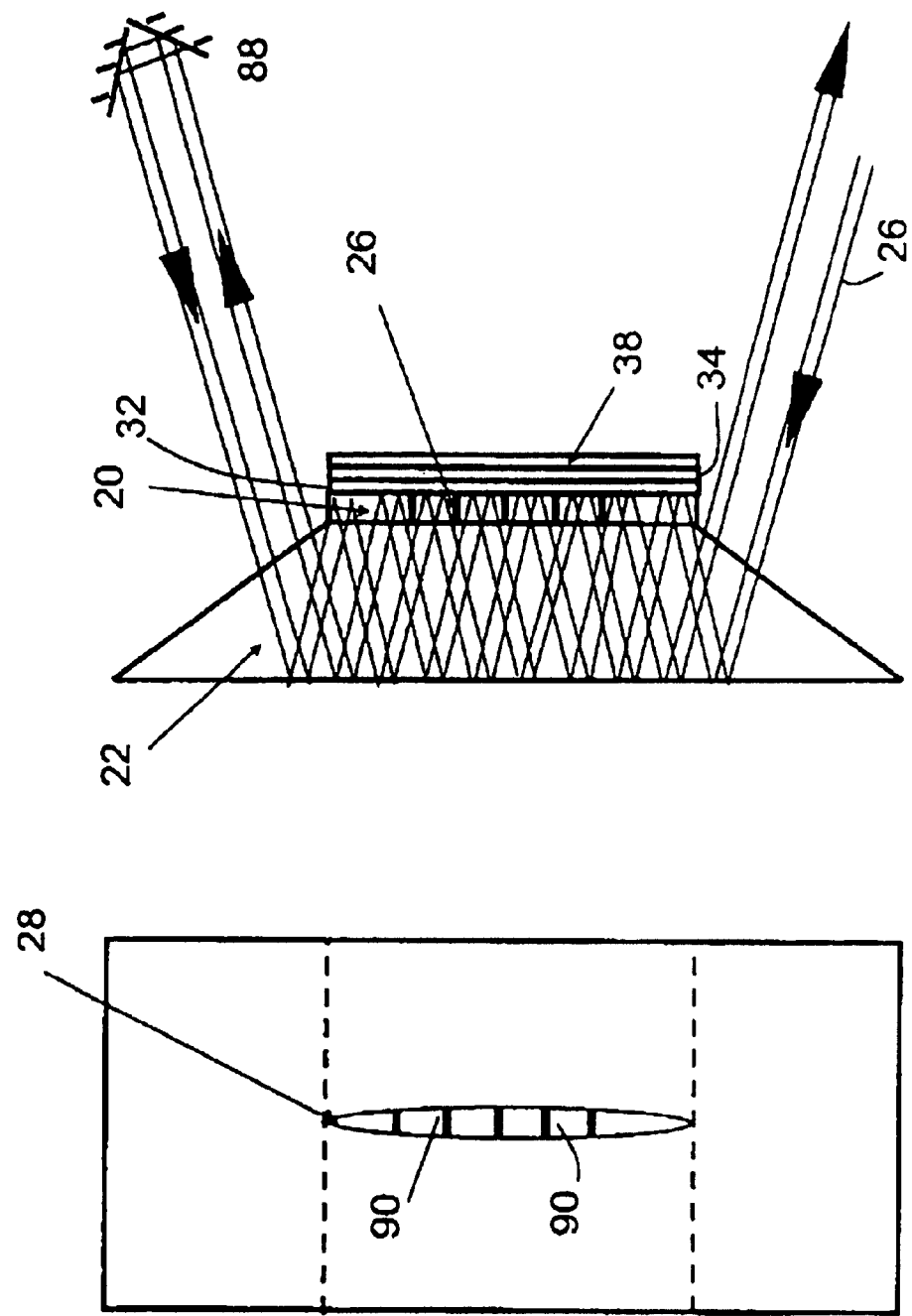
FIG. 7 shows an embodiment of the laser gain medium used in the solid state laser amplifier which reduces or prevents ASE.

Overall for most materials, the gain that can be achieved with these structures becomes exceedingly high that accumulated stimulated emission (ASE) becomes the dominant factor limiting the achievable gain and power for a given structure. The problem of parasitic ASE losses are most pronounced along the longest dimension of the pumped gain region $L_1$ where the accumulated gain is largest. The very thin features of the gain medium 20 open up yet another parameter for further optimization to minimize ASE effects that have long plagued high gain amplifiers. With such thin dimensions, one can use laser micromachining to drill out small slots in the laser active solid that extend throughout the entire thickness $t_1$ and are made to spatially coincide with the region $L_1' \times W_1'$ of the pumped gain region 28. The thin feature of the laser gain makes it possible to make slits 90 as shown in FIG. 7 as small as 1 to 10 microns (depending on the thickness $t_1$) without incurring diffraction problems that would limit the width of such slots for thicker materials.

These slots 90 form channels once the laser active material 20 is bonded to the transparent solid substrates and can be filled with strongly absorbing material to introduce loss periodically along the $L_1'$ direction of maximum gain. Materials such as carbon black [16] interspersed in indium metal or specifically designed quantum dot semiconductors to absorb only at the laser wavelength [17] suspended in a thermally conducting polymer matrix to act as saturable absorbers, can be used as can any material that strongly absorbs at the laser wavelength and can be vapour sublimated to coat the surfaces within the channel.

Air spaces with rough surface edges will also be useful to introduce strong loss modulation along the direction $L_1$. These slots 90 are placed at intervals equal to $W_1$ or less so that the ASE problems are no more worse than the fundamental limit defined by the gain in the $W_1$ direction. The total amount of lossy material introduced is insignificant relative to the total gain volume, being less than 1% of the gain volume. Spontaneous emission with components in the x direction traveling along the longest length of the gain region will be effectively suppressed. The losses due to ASE will suppressed by a factor $\exp[g(L_1-W)]$ by this method where W is the spacing between the channels and g is the effective gain per unit length in the small signal limit. This feature enables exponential contrast against ASE. The problem then reduces to directing the laser beam to be amplified along a specific path that avoids these strong loss regions. In this regard it is important to have the ability to make the slits as small as possible.

Figure 8A:
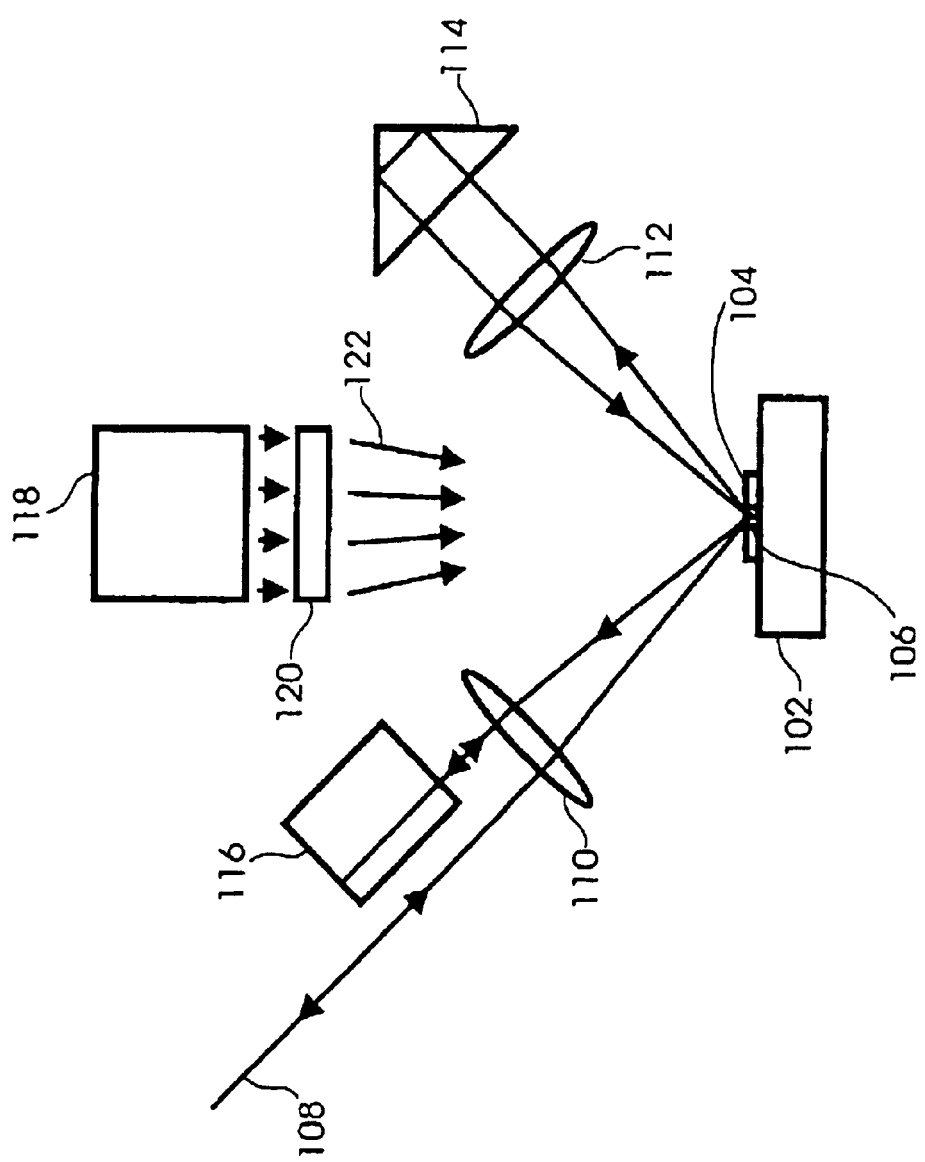
FIGS. 8a and 8b show another embodiment of a solid state laser amplifier according to the present invention.
Figure 8B:
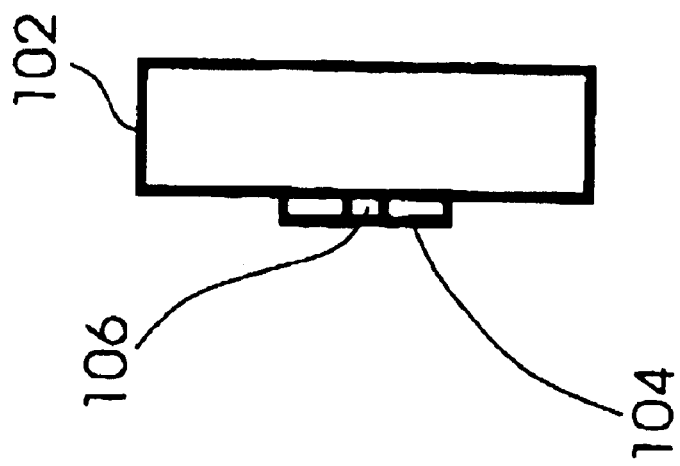
Figure 8B:
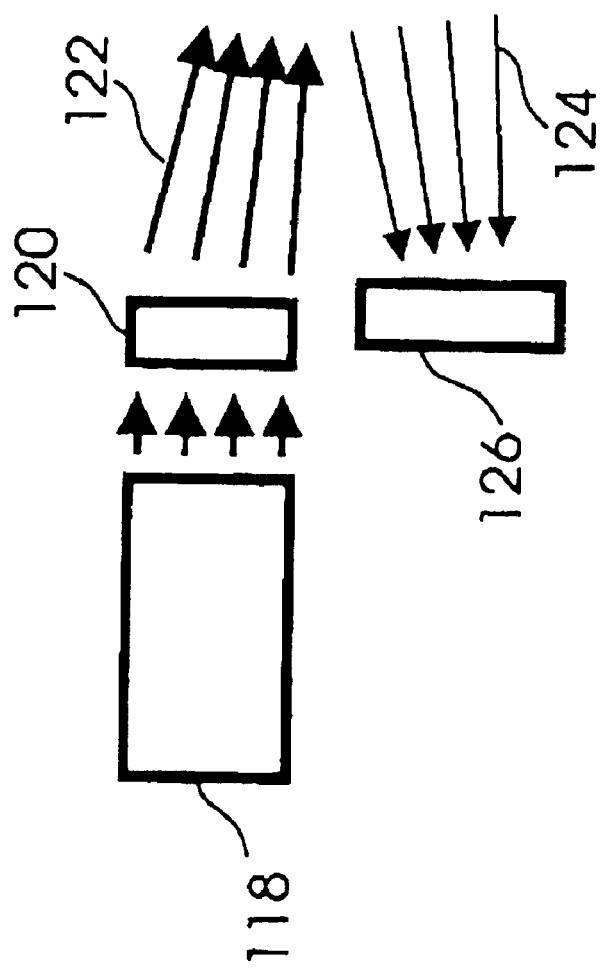

FIGS. 8(a) and 8(b) show another embodiment of an amplifier which can be built from commercially available components and simply aligned. The pump source is a laser diode linear bar 118 with typical output powers in 20-60 W range. The pump light is directed and focused by an optical system 120 which focuses the pump light 122 onto the thin solid active laser material 104 creating the tight gain region 106. The typical size of gain region in the plane parallel to the active material surface is around 1 mm. The optical system 120 can for example include two cylindrical lenses that focus the pump light in slowly and fast diverging planes of the laser diode 118. It can also include a wedge for changing the direction of the pump light so it hits the thin disk 102 under a small angle so the back reflection of the unabsorbed pump light 124 does not hit the laser diode 118 shown in FIG. 8b. The unabsorbed pump light 124 can be disposed by a heat sink 126 or alternatively refocused and reflected back onto the gain region 106 to increase the overall absorption. The thin active laser material 104 is attached on a metal heat sink 102 so the major heat flow from the gain region is approximately perpendicular to the interface between the thin laser active material 104 and the heat sink 102.

The laser beam to be amplified 108 is introduced into the amplifier approximately collimated and focused on the gain region 106 with a lens 110. The focused spot of laser beam 108 on the surface of the active laser material 104 has approximately same size as the size of the focused pump spot on the active material. After amplification and reflection from the back surface of the active material the laser beam 108 is re-collimated by another lens 112 and back reflected by 180° folding prism. The laser beam is focused again by lens 112, amplified and reflected through the gain region 106 and re-collimated again by the lens 110. The laser beam 108 is subsequently reflected back by a mirror or preferably by another 180° folding prism in the plane perpendicular to the first folding plane so it will go through the gain region two more times before it exits the amplifier as showed on the FIG. (8a).

FIG. (8b) is the side view of the described system and showing the pump light 122 hitting the active material 104 under the small angle after which the unabsorbed light 124 is collected by a heat sink 126. The light from laser diode bars is polarized so that polarization can be adjusted to maximize the absorption in the active material 104. For example, in case of $Nd^{3+}:YVO_4$ with 1% doping as the active material and the active material thickness 0.4 mm it is possible to achieve 80-90% of absorption in a single double pass. The amplifier performance can be improved by attaching a non-active slab on the top of the active material 104 by diffusion bonding as discussed above. The field replacement of the pump source can be simplified if high power fiber coupled laser diode is used instead of the laser diode bar. The beam quality of the amplified laser beam can be improved by inserting one or more spatial filters for the laser beam 108 during its passes through the amplifier as known to the people skilled in the art. The number of passes through the gain medium can be easily increased by adding additional prisms and mirrors. The amplifier can be folded by using two focusing mirrors instead of lenses 110 and 112.

CONCLUSION

The use of thin laser active solid region is to increase the heat transfer rate to the heat sink for maximum output power, increase the gain per unit length for beam propagation in the plane of the laser active solid, and to enable straightforward structuring of the gain region to avoid ASE problems. The thin laser active solid has the smallest dimension defined as $t_1$ for thickness and has a width $W_1$ and length $L_1$. The typical dimensions of the laser active solid will have $t_1$ values from 10 microns to 1 mm, $L_1$ values from 10 microns to several centimeters, and $W_1$ values from 10 microns to 1 cm. An undoped solid material is bonded to the laser active solid to provide structural support and to serve as a refractive optic for angular multiplexing the laser beam to be amplified into the pumped gain region. This material is transparent at the pump wavelength to permit pump access to the laser active solid and has dimensions $L_2 \times W_2 \times t_2$ where the dimensions are comparable to the laser active medium but with $t_2 >> t_1$.

As opposed to all other inventions that use thin laser active solids under uniform pumping conditions to create isotherms parallel to the surface of the cooling device, this invention specifically employs non-uniform pumping conditions to further confine the gain in the two directions L and W that are orthogonal to the direction defined by its smallest dimension $t_1$. This non-uniform pumping is accomplished by a optical system for the diode laser pump source so as to define an elongated pumped gain region within the laser active gain media of dimensions $L_1'$ and $W_1'$ in which $L_1' < L_1$ and $W_1' < W_1$. The thickness $t_1$ is a compromise between being as thin as possible to attain maximum heat transfer and absorbing sufficient pump light to maintain high efficiency of the device.

The optical system enables multiple passes of the pump light in the regions $L_1'$ and $W_1'$ to enable thinner crystals to be used than single pass pump configurations. The multipass feature also enables a degree of gain saturation within the defined pump region to attain a condition of parallel isotherms within said defined pumped area as defined by dimensions $L_1' \times W_1'$ and of approximate thickness $t_1$. The non-uniform pumping is specifically carried out to increase the number density of excited states per unit area for maximum gain per unit length without introducing surface heating effects and fracture of the uncooled surfaces. The dimensions $L_1'$ and $W_1'$ are specifically chosen to match the incoming laser beam for optimal spatial overlap of the gain region for beam propagation along the length L without incurring diffraction losses and maximum power transfer to said laser beam while maintaining high brightness.

The higher gain per unit length with this non-uniform pumping arrangement leads to nonparallel isothermal components to the surface with thermal gradients along L, W, and t directions. These thermal gradients have associated index of refraction gradients due to the dn/dT dependence of the laser active solid and can lead to strong aberrations of the laser beam to be amplified [5]. These effects are removed by using at least one reflection off the interface in contact with the cooling device. This plane creates a unique inversion symmetry which upon reflection, cancels the differences in index of refraction experienced by different parts of the beam along the t direction.

An advantageous feature of this invention is the use of multipass optics to enable the laser beam to undergo multiple reflections with the cooled surface and further average out the effects of thermal aberrations on the amplification process; while simultaneously increasing the extraction efficiency from the pumped laser gain region. The high gain feature is also an important feature of this invention as the number of said round trips for complete or saturated extraction of the gain is reduced to a few round trips such the total beam path through the aberrating medium is reduced as much as possible and in turn reduces the accumulated affect of thermally induced the index of refraction gradients on the spatial profile of the amplified laser beam. In a related embodiment, if the angle of the laser beam to the surface normal is made to be a glancing angle, the effects of thermal gradients along the W direction can also be removed if desired, while still maintaining good spatial overlap with the gain region, by simultaneously reflecting off the two orthogonal surfaces (L×t) multiple times in a zig zag fashion to spatially average out the transverse differences to the index of refraction.

The beam is propagating in the L directions so gradients are inconsequential along this axis. For the highest power operation, the thermally induced aberrations are eliminated for all practical purposes by the use of cryogenic cooling to attain an operating temperature below a threshold value, under pumped conditions within the laser active region, at which point the index of refraction changes with temperature are negligibly small (near or at dn/dT=0 point). Temperature rather than uniform pumping is used to generate an effectively spatially invariant index of refraction throughout the laser active gain media. Any small residual aberrations can be completely removed with the angle multiplexing of pump and laser beam as described above.

The thin feature of the gain media enable the straightforward imaging of low brightness laser diodes, laser diode array, vertically stacked laser diode arrays, or fibred coupled array pump sources to create cylindrical focused pump beams to give the desired approximate $L_1' \times W_1'$ pumped area throughout the thickness of the laser active solid. These beams may be relay imaged back to strike the same region multiple times using conventional combinations of lens, mirrors, and retroreflectors on the micro or macroscale. Alternatively nonimaging optics such as lens ducts can be used in which case the pumped region takes on the same values of the laser active solid ($L_1$, $W_1$, and $t_1$) with proper reflective and refractive elements bonded to the laser active solid to confine the nonimaged pump light.

For a given $W_1'$ the overall gain of these amplifiers is increased by increasing the value for $L_1'$ and permits scaling of the gain and average power for this class of amplifier modules. The gain eventually becomes so appreciable that ASE creates a serious problem for gain storage. This problem is mitigated for the highest gain amplifier modules by periodically imbedding strong absorbing centers or scattering centers along the L or x direction, within the designed $L_1'$ pumped region, at intervals equal to or smaller than the width of the pumped region $W_1'$. The thickness of the imbedded absorbing material or scattering centers extends the full $t_1$ thickness of the laser active solid. This periodic loss blocks spontaneous emission from experiencing the highest gain along the $L_1'$ or x direction which introduces a loss for the gain storage that is exponentially larger by the difference $L_1'-W_1'$ than ASE losses along the $W_1'$ or y direction. The width of these loss centers can be submicron to micron such that less than 1% of the potential gain is lost in the process. Problems with ASE losses in the y and z directions and back reflections in the x direction are handled by appropriate inclined angles to prevent back reflections, saturable absorbers along the laser beam propagation as needed to prevent back reflections seeding ASE, and other measured employed by those skilled in the art.

As used herein, the terms "comprises" and "comprising" are to be construed as being inclusive and open ended, and not exclusive. Specifically, when used in this specification including claims, the terms "comprises" and "comprising" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

REFERENCES

[1] Tunnermann A, Hofer S, Liem S, Limpert J, Reich M, Roser F, Schreiber T, Zellmer H, Peschel T, Guyenot V, "Power scaling of high-power fiber lasers and amplifiers", Laser Physics, 15 (1): 107-117 January 2005

[2] Durfee C G, Backus S, Murnane M M, Kapteyn H C, "Design and implementation of a TW-class high-average power laser system", IEEE J. Sel. Top. Quantum Electron., 4 (2): 395-406 March-April 1998

[3] Vogel A, Venugopalan V, "Mechanisms of pulsed laser ablation of biological tissues", Chem. Rev. 103, 577 (2003)

[4] W. Koechner, Solid-State Laser Engineering, 5$^{th}$ edition, Springer (1999)

[5] Clarkson W A, "*Thermal effects and their mitigation in end-Pumped solid-state lasers*", Journal of Physics D—Applied, 34 (16): 2381-2395, Aug. 21, 2001

[6] Brauch, Uwe; Giesen, Adolf; Voss, Andreas; Wittig, Klaus; "Laser amplifying system", U.S. Pat. No. 5,553,088.

[7] Wittrock, Ulrich; , "Solid state laser amplifier", U.S. Pat. No. 6,944,196

[8] Backus S, Bartels R, Thompson S, et al., "*High-efficiency, single-stage 7-kHz high-average-power ultrafast laser system*", Opt. Lett., 26 (7): 465-467, Apr. 1, 2001

[9] Byer, Robert L.; "High power solid state laser", U.S. Pat. No. 4,555,786

[10] Alcock, Alfred J.; Bernard, John E.;, "High efficiency transversely pumped solid-state slab laser", U.S. Pat. No. 5,315,612

[11] Beach, Raymond J.; Honea, Eric C.; Bibeau, Camille; Payne, Stephen A.; Powell, Howard; Krupke, William F.; Sutton, Steven B.; "High average power scaleable thin-disk laser", U.S. Pat. No. 6,347,109

[12] Brown D C, "*The promise of cryogenic solid-state lasers*", IEEE J. Sel. Top. Quantum Electron., 11 (3): 587-599 May-June 2005

[13] St. Pierre R J, Mordaunt D W, Injeyan H, Berg J G, Hilyard R C, Weber M E, Wickham M G, Harpole G M, Senn R, "Diode array pumped kilowatt laser", IEEE J. Sel. Top. Quantum Electron., 3 (1): 53-58, February 1997

[14] Ripin D J, Ochoa J R, Aggarwal R L, et al., "165-W cryogenically cooled Yb: YAG laser", Opt. Lett., 29 (18), 2154-2156, Sep. 15, 2004

[15] Miller, Robert John Dwayne; Liao, Yan; Armstrong, Michael Robert; Walker, David Ronald; "Laser clamping assembly and method", U.S. Pat. No. 6,385,220.

[16] A. A. Oraevsky, L. B. Da Silva, A. M. Rubenchik, M. D. Feit, M. E. Glinsky, M. D. Perry, B. M. Mammini, W. Small IV, and B. C. Stuart, "Plasma mediated ablation of biological tissues with nanosecond-to-femtosecond laser pulses: relative role of linear and nonlinear absorption," *IEEE J. Sel. Top. Quantum Electron.*, 2(4), 801-809 (1996)

[17] Margaret A. Hines and Gregory D. Scholes, "Colloidal PbS nanocrystals with size-tunable NIR Emission: Observation of post-synthesis self-narrowing of the particle size distribution", Adv. Mater. 15, 1844 (2003).

Therefore what is claimed is:

1. A solid-state laser amplifier system, comprising:
a) at least one laser-active solid having dimensions length $L_1$, width $W_1$, and thickness $t_1$;
b) a pumping light source;
c) light beam shaping optical system positioned adjacent to the pumping light source for shaping and directing a pump light beam from said pumping light source into a first surface of said at least one laser-active solid with an elliptical, round, or rectangular beam of light with a length or long axis $L_1'$ and a width of $W_1'$ satisfying a condition $L_1'/W_1' \geqq 1$, and $L_1' < L_1$ and width $W_1' < W_1$, and wherein a region of said at least one laser-active solid illuminated by the beam of light produces a pumped gain region defined by dimensions $L_1' \times W_1' \times t_1$ of said at least one laser-active solid, and wherein $t_1$ is in a range from 10 microns to 1 millimeter so as to most strongly localize the absorbed light and ensuing pumped gain region that develops from pumping said at least one laser-active solid with said pump light;

d) a cooling device, wherein the laser-active solid is slab-shaped and is fixedly connected at a second surface thereof to the cooling device, and wherein a major portion of heat generated in the laser-active solid by the pump light is removed by the cooling device to cool the second surface of the laser-active solid and, wherein the slab-shaped laser active solid includes periodically disposed channels of length between about 0.1 micron to about 100 microns, said channels being filled with an absorbing material or scattering centers to introduce regions of absorption and scattering losses along a direction defined by $L_1$ and prevent accumulated stimulate emission along the $L_1'$ pumped region from depleting the gain in this direction and accompanying reduction in pulse guality for use in the amplification of laser pulses; and e) an optical system configured to bring the laser beam to be amplified into the laser active solid at an angle to a normal to the first surface of the laser active solid to remove substantially nonparallel isotherms that arise from nonuniform pumping of the laser active solid by the pump light beam and cooling requirements to achieve high gain conditions for the laser beam.

2. The solid-state amplifier system according to claim 1 wherein said optical system and said laser active material are configured to direct the laser beam to make at least two passes through the laser gain medium to further average the thermal aberrations and increase energy extraction from the said gain volume.

3. The solid state amplifier system according to claim 1 in which the cooling device is a cryogenic cooler that maintains the temperature of the laser active solid under pumped conditions at a temperature at which a differential change in index of refraction of the laser active solid with temperature is substantially close to zero (dn/dT=0) to further reduce thermal aberrations.

4. The solid-state laser amplifier system according to claim 1 wherein said channels are small cylinders or narrow lines that run parallel to a direction of $W_1'$ of the pumped gain medium.

5. The solid-state laser amplifier system according to claim 1 wherein the absorbing material are selected from the group consisting of semi-metals that strongly absorb at the laser wavelength, specifically tuned quantum dots tuned to act as saturable absorbers at the laser wavelength imbedded in an index matching polymer.

6. The solid-state laser amplifier system according to claim 1 wherein the scattering centers include air spaces or voids.

7. The solid-state laser amplifier system according to claim 1 including a slab-shaped nonactive laser material bonded to said first surface of said slab-shaped laser active solid to give a composite structure to provide mechanical strength for thermal contact of said slab-shaped laser active solid to the cooling device, said slab-shaped nonactive laser material having an index of refraction for matching an index of refraction of said laser active solid to avoid diffraction and Fresnel losses in coupling the laser beam to be amplified into and out of the pumped gain region.

8. The solid-state laser amplifier system according to claim 7 wherein said composite structure formed by the slab-shaped nonactive laser material bonded to said first surface of the slab-shaped laser active solid is shaped as a trapezoid or parallelepiped with a pre-selected angle at the ends of the composite structure into which the laser beam being amplified is directed and an output from which the amplified laser beam exits from the composite structure, and wherein said optical system is configured for redirecting the amplified laser beam back through the pumped gain volume to substantially average out thermal aberrations for further increasing gain of the laser beam.

9. The solid-state laser amplifier system according to claim 7 wherein said optical system is configured for directing the laser beam to be amplified through the surface of the non-laser-active solid along the pump light beam direction in an angle multiplexed fashion to substantially overlap with the pumped gain volume along the $L_1'$ direction primarily in a region where the temperature isotherms are most parallel to the cooled surface.

10. The solid-state laser amplifier system according to claim 7 wherein said optical system is configured for directing the laser beam to be amplified through the composite structure at an angle substantially parallel to the surface of the laser active material in contact with the cooler in such a way as to a zig-zag beam path through the pumped gain volume that effectively averages out nonparallel components of the thermal isotherms experienced by different parts of the laser beam to be amplified and thereby remove or greatly reduce thermal aberrations on said laser beam.

11. The solid-state laser amplifier system according to claim 7 wherein said optical system is configured for directing the laser beam to be amplified through the composite structure at an angle to the surface normal in such a way as to cancel out nonparallel components of the thermal isotherms along the surface normal experienced by the laser beam to be amplified and thereby remove or greatly reduce thermal aberrations on said laser beam.

12. The solid-state laser amplifier system according to claim 7 said optical system is configured for directing the laser beam to be amplified through the composite structure at a preselected angle to the surface normal and for producing a zig zag beam path in a plane of the first surface to average out nonparallel components to thermal gradients in both orthogonal directions to the surface normal along both directions of $W_1$ and $t_1$.

13. The solid state amplifier system according to claim 12 in which the cooling device is a cryogenic cooler that maintains the temperature of the laser active solid under pumped conditions at a temperature at which a differential change in index of refraction of the laser active solid with temperature is substantially close to zero (dn/dT=0) to further reduce thermal aberrations.

14. The solid state amplifier system according to claim 7 in which the cooling device is a cryogenic cooler that maintains the temperature of the laser active solid under pumped conditions at a temperature at which a differential change in index of refraction of the laser active solid with temperature is substantially close to zero (dn/dT=0) to further reduce thermal aberrations.

15. The solid-state laser amplifier system according to claim 1 wherein said optical system is configured for directing the laser beam to be amplified into the pumped gain region at one or more angles to generally avoid the regions of absorption and scattering losses as the laser beam passes through the pumped gain volume.

16. The solid-state laser amplifier system according to claim 15 in which the cooling device is a cryogenic cooler that maintains the temperature of the laser active solid under pumped conditions at a temperature at which a differential change in index of refraction of the laser active solid with temperature is substantially close to zero (dn/dT =0) to further reduce thermal aberrations.

17. The solid-state laser amplifier system according to claim 1 including a dielectric material located between the second surface of the laser active solid and the cooling device to give increased reflection of said laser beam to be amplified while simultaneously providing good thermal contact of said laser active solid to said cooling device.

18. The solid-state laser amplifier system according to claim 1 wherein said pumping light source is a laser diode array.

19. The solid-state laser amplifier system according to claim 1 wherein said pumping light source is a vertical stack of linear laser diode arrays.

20. The solid-state laser amplifier system according to claim 1 wherein said pumping light source is a fibre coupled laser diode array or vertical stack of linear diode arrays.

21. The solid-state laser amplifier system according to claim 1 wherein the pumping light source is a laser pump source.

22. The solid-state laser amplifier system according to claim 1 wherein said optical system is configured for directing the laser beam to be amplified through the surface of the laser-active solid along a direction which is substantially the same as the pump light beam direction in an angle multiplexed fashion so that the laser beam to be amplified makes two or more passes through the pumped gain volume.

23. The solid-state laser amplifier system according to claim 1 wherein the laser active solid is selected from the group consisting of YAG, YLF, $YVO_4$ and Sapphire host crystals containing laser active atoms selected from the group consisting of Ti, Nd, Er, Yb, Cr in YAG, YLF, YVO4 and Sapphire host crystals.

* * * * *